United States Patent [19]

Egan

[11] Patent Number: 4,562,462

[45] Date of Patent: Dec. 31, 1985

[54] COLOR LASER PRINTER WITH IMPROVED EFFICIENCY

[75] Inventor: Richard G. Egan, Dover, Mass.

[73] Assignee: Polaroid Corporation, Cambridge, Mass.

[21] Appl. No.: 529,104

[22] Filed: Sep. 2, 1983

[51] Int. Cl.$^4$ .......................... H04N 1/46; G01D 9/42; G02B 27/14

[52] U.S. Cl. ...................................... 358/75; 346/108; 350/173; 350/174

[58] Field of Search ........................ 358/75, 76, 77, 78, 358/80; 350/168, 169, 170, 171, 173, 174, 286, 102, 394, 400, 401, 402; 346/108, 109

[56] References Cited

U.S. PATENT DOCUMENTS

| 2,002,515 | 5/1935 | Worrall | 358/61 |
|---|---|---|---|
| 3,457,416 | 7/1969 | Elliott | 350/168 |
| 3,506,779 | 4/1970 | Brown et al. | 178/6.6 |
| 3,639,684 | 2/1972 | Levine | 358/42 |
| 3,743,383 | 7/1973 | Giallorenzi | 350/170 |
| 3,975,748 | 8/1976 | Green et al. | 358/78 |
| 4,264,921 | 4/1981 | Pennington et al. | 358/78 |

FOREIGN PATENT DOCUMENTS 0084434 7/1983 European Pat. Off. .............. 358/60

OTHER PUBLICATIONS

Wang et al., "Calcite Prisms as High-Power Laser Beam Combiners", Applied Optics, Jun. 1965, vol. 4, No. 6, pp. 759-761.

Primary Examiner—James J. Groody
Assistant Examiner—Randall S. Svihla
Attorney, Agent, or Firm—Edward S. Roman

[57] ABSTRACT

A multispectral laser printing system in which beam splitting and beam recombination are accomplished by light refracting optical elements instead of beam splitters in order to materially improve efficiency. In one embodiment such beam splitting and recombination can be achieved by a single light refracting optical element such as a prism.

8 Claims, 3 Drawing Figures

COLOR LASER PRINTER WITH IMPROVED EFFICIENCY

BACKGROUND OF THE INVENTION

1. Field of the Invention

This invention relates generally to a multispectral laser printing system and, more particularly, to a multispectral laser printing system employing efficient optical elements.

2. Background of the Prior Art

Multispectral laser printing systems are well known in the art as evidenced by U.S. Pat. No. 3,975,748, entitled "Multispectral Laser Camera Device", issued Aug. 17, 1976. The aforementioned patent shows a laser printing system embodying a helium neon laser to provide a red wavelength band and an argon laser to provide a multispectral wavelength band having green and blue wavelength components. The multispectral wavelength band is thereafter separated by a beam splitter into its blue and green wavelength components by a plurality of dichroic mirrors which operate to separate the different wavelengths of light in order to enable each wavelength of light to be individually modulated. The modulated red, green and blue wavelength beams are thereafter recombined by another plurality of dichroic mirrors back into a single multispectral wavelength beam which is thereafter directed to line scan photosensitive material in order to record the desired color image. The dichroic mirrors which are utilized both as beam splitters and beam recombiners are generally in the order of 50 percent efficient thus resulting in a 50 percent loss of beam energy each time a multispectral wavelength beam is split or each time two different wavelength beams are recombined into a multispectral wavelength beam. Thus, there is a substantial loss in beam energy as a result of the use of such beam splitters resulting in a substantial reduction in the overall efficiency of the laser printing apparatus.

Therefore, it is a primary object of this invention to provide a multispectral laser printing system in which the high energy losses attributable to beam splitters is eliminated.

It is a further object of this invention to provide a multispectral laser printing system of high efficiency in which beam splitting and beam recombination are accomplished by highly efficient light refracting optical elements.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

A multispectral laser printing apparatus of the type in which at least two laser beams of different spectral characteristics are provided also includes means for photomodulating each laser beam in response to an electrical signal representative of that spectral characteristic of the image to be printed. The laser printing apparatus also includes means for line scanning a photosensitive material with the modulated laser beams in order to print the image onto the photosensitive material. Means are also provided for recombining the modulated laser beams into a single multispectral beam. Such means includes at least one light refracting optical element structured and situated to effect a recombination of the modulated laser beams into the single multispectral beam which is thereafter directed to the means for line scanning the photosensitive material.

The multispectral laser printing apparatus may include another light refracting optical element structured and positioned to receive a single laser beam and to refract the received laser beam to provide at least the two laser beams therefrom. Alternatively, the one refracting optical element could be structured and arranged to receive a single laser beam and to refract the received laser beam to provide at least the two laser beams therefrom. The light refracting element may comprise either a prism or a defraction grating.

DESCRIPTION OF THE DRAWINGS

The novel features that are considered characteristic of the invention are set forth with particularity in the appended claims. The invention itself, however, both as to its organization and method of operation together with other objects and advantages thereof will be best understood from the following description of the illustrated embodiment or when read in connection with the accompanying drawings wherein like numbers have been employed in different FIGS. to denote the same parts and wherein:

DESCRIPTION OF THE PREFERRED EMBODIMENTS

Figure 1:
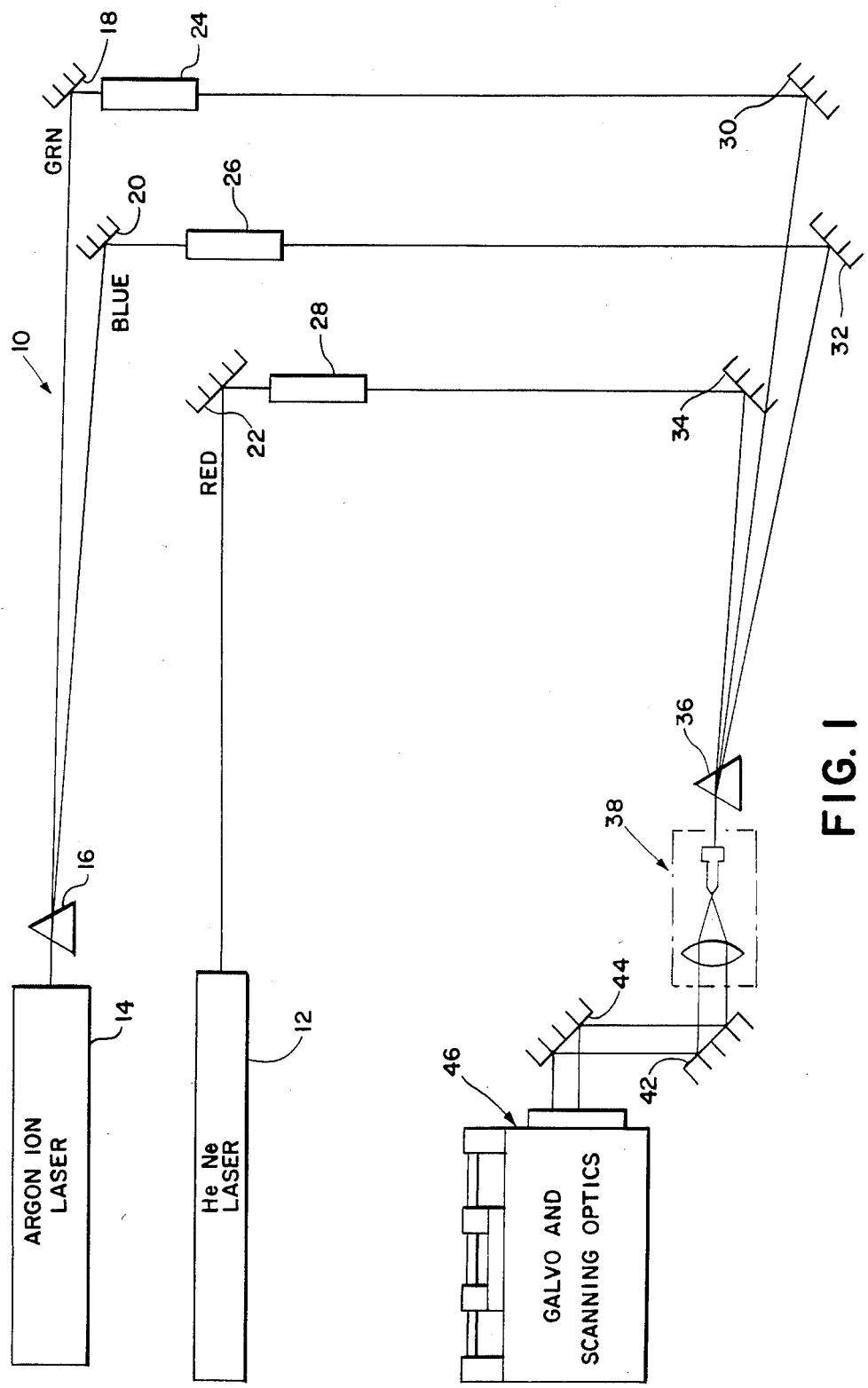
FIG. 1 is a schematic diagram of the multispectral laser printing system of this invention.

Referring now to FIG. 1 there is shown generally at 10 a schematic diagram for the multispectral laser printing system of this invention wherein the radiant energy source comprises a helium neon laser 12 which emits radiant energy having a red spectral characteristic and an argon ion laser 14 which emits radiant energy having both a green spectral characteristic and a blue spectral characteristic. The radiant energy emitted by both the argon ion laser 14 and the helium neon laser 12 is plane polarized in order to effectively optimize the transmission efficiency of the radiant energy through the refracting optical elements of this invention which are characterized by prisms 16 and 36 in FIG. 1.

The optical prism 16 operates to separate the multispectral radiant energy received from the argon ion laser 14 into predominantly green and blue wavelengths which are reflected respectively by mirrors 18 and 20 to photomodulators 24 and 26. The predominantly red wavelength beam from the helium neon laser 12 is reflected by a mirror 22 to a photomodulator 28. Photomodulators 24, 26 and 28 are well known in the art and operate to modulate the intensity of the beam of radiation passing therethrough in accordance with electrical signals applied respectively to the photomodulators. The electrical signals define the individual color components of the image to be recorded by the laser printing system of this invention in a manner well known to the art. The modulated green, blue and red wavelength beams emanating from the photomodulators 24, 26, 28, respectively, are thereafter reflected by mirrors 30, 32 and 34, respectively, for recombination by the prism 36. The single multispectral wavelength beam emanating from the prism 36 is thereafter directed to a beam expander 38 which operates to increase the beam diameter in a well-known manner in order to accommodate the focusing of a smaller dot during the actual line scanning operation of the photosensitive material. The expanded multispectral wavelength beam is thereafter reflected by mirrors 42 and 44 into a printer 46 which operates to line scan the focused multispectral wavelength beam in a well-known manner to expose a photosensitive material. The printer 46 may embody horizontal and vertical beam deflectors to achieve a two-dimensional line scan across a fixed photosensitive material in a manner as is disclosed in U.S. Pat. No. 3,506,779, entitled "Laser Beam Typesetter", issued Apr. 14, 1970, and now incorporated by reference herein. Alternatively, the printer 46 may include only a horizontal beam deflector to achieve a horizontal line scan of the multispectral wavelength beam while the film is incrementally advanced in the vertical direction in a manner well known to the art.

As is readily apparent, the prisms 16 and 36 replace beam splitters as was heretofore utilized, i.e., U.S. Pat. No. 3,975,748, supra, thereby minimizing the attendant inefficiencies associated with such beam splitters which are generally only in the order of 50 percent efficient. Prisms having suitable dispersion angles for use in the multispectral laser printing system of this invention preferably comprise a grade A fine annealed glass having a high refractive index together with a low Abbe factor and a low stress birefringency. One such glass is sold under the tradename LaSf-9. It has an index of refraction of 1.8449 and a low Abbe factor as well as suitable thermal properties. Another such suitable material is sold under the tradename Cvd Clearatron.

Figure 2:
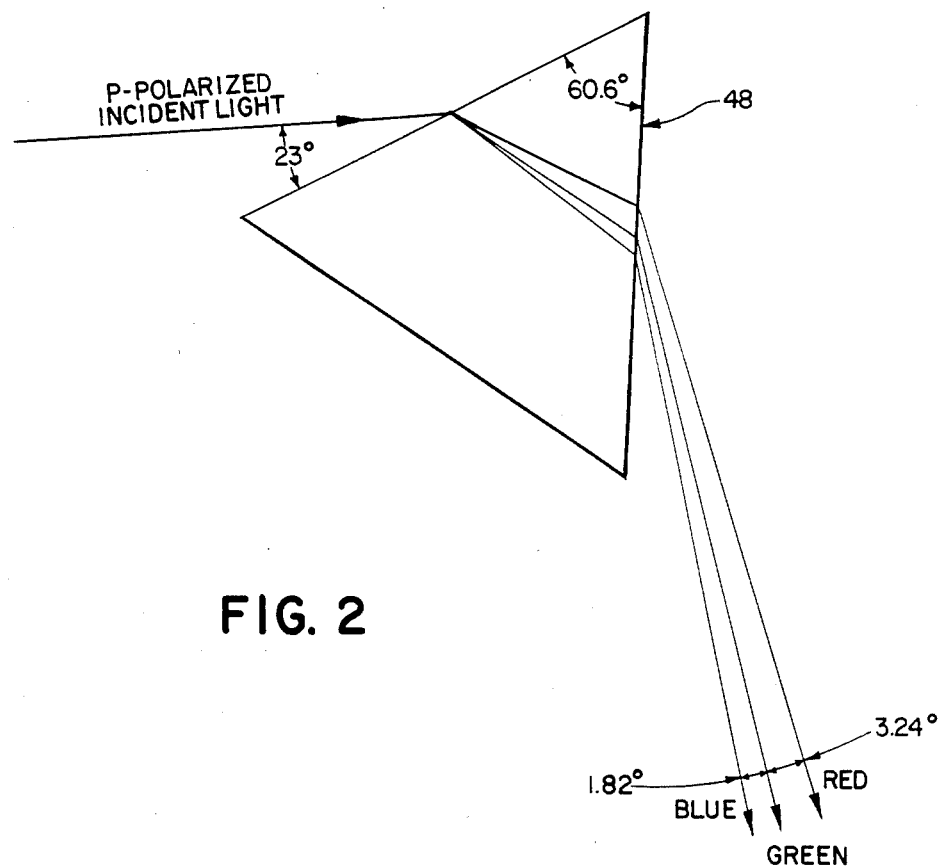
FIG. 2 is a side view of a prism utilized in the system of FIG. 1.

Referring now to FIG. 2 there is shown at 48 a prism made from LaSf-9 Grade A fine annealed glass and optimized to provide acceptable dispersion angles with minimum reflection losses at the prism surfaces. Optimized dispersion angles of 1.82 degrees are provided between the blue wavelength beam and the green wavelength beam and 3.24 degrees between the green wavelength beam and the red wavelength beam with total uncoated reflection losses of 9 percent for the blue wavelength beam, 6 percent for the green wavelength beam and 4 percent for the red wavelength beam assuming an incident multispectral beam of plane polarized light. In addition, the apex of the prism is configured to define an angle of 60.6 degrees and the prism is oriented relative to the incident multispectral wavelength beam to define an angle of incidence of 23 degrees.

Figure 3:
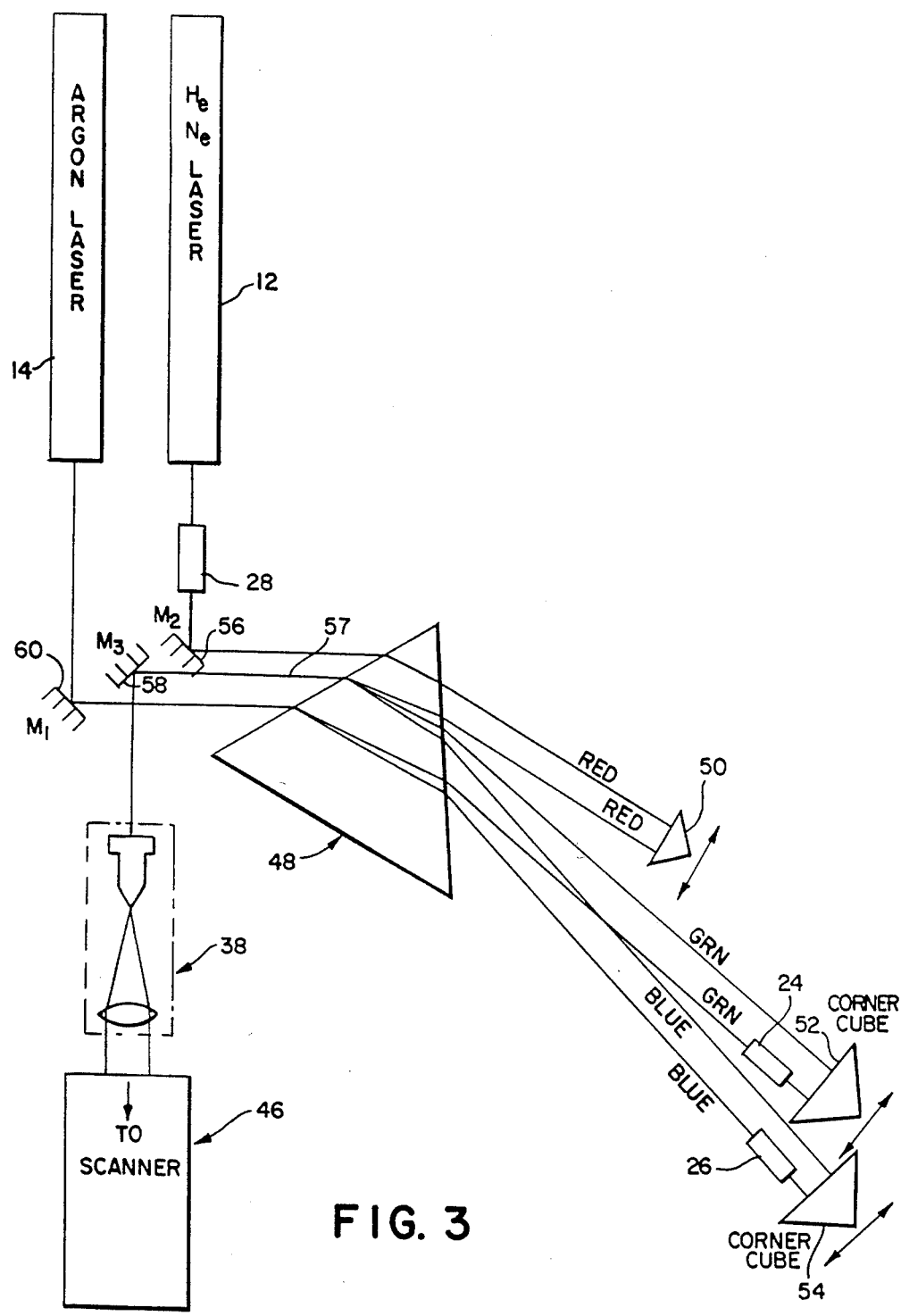
FIG. 3 is a schematic diagram of an alternate embodiment for the multispectral laser printing system of FIG. 1.

Referring now to FIG. 3 where like numerals depict the aforementioned elements there is shown an alternate arrangement for the multispectral laser printing system of this invention embodying a single prism 48 for accomplishing both beam separation and recombination in the aforementioned manner. The helium neon laser 12 thus provides the red wavelength beam to the optical modulator 28 after which the red wavelength beam is reflected by a mirror 56 for transmission and refraction by the prism 48. The red wavelength beam emanating from the prism 48 is thereafter reflected by a corner cube 50 in a manner as is well known in the art back to the prism 48 for recombination in a multispectral wavelength band as shown at 57. Corner cubes are well known in the art and operate to reflect a beam of light in a direction parallel to the incident beam of light regardless of the angle of incidence at which the incident beam strikes the corner cube. The argon laser 14 emits a blue and green wavelength beam which is subsequently reflected by a mirror 60 for transmission and refraction by the prism 48 into a green wavelength beam and a blue wavelength beam. The green and blue wavelength beams are subsequently modulated by the photomodulators 24 and 26 respectively. The modulated green and blue wavelength beams are thereafter reflected respectively by corner cubes 52 and 54 back for recombination by the prism 48 into the multispectral wavelength beam 57. The multispectral wavelength beam, in turn, is reflected by a mirror 58 to the beam expander 38 from which it is directed to the printer 46 in the aforementioned manner.

As is readily apparent, the prism 48 operates to separate the multispectral wavelength beam from the argon laser 14 into blue and green wavelength beams which are subsequently modulated and reflected back to the prism 48 for recombination with the red wavelength beam to provide the multispectral wavelength beam 57 to the printer 46. In this manner, beam separation and recombination are accomplished by the same single light transmitting and refracting prism 48.

The refractive index temperature coefficient for the aforementioned LaSf-9 glass is approximately $10^{-6}$ thereby in turn affecting at $3.6 \times 10^{-6}$ degree/C° angle shift. Although such an angular shift is small, the arrangement of FIG. 3 provides for temperature compensation since all three wavelengths are shifted with temperature during the first beam dispersion and thereafter shift in an equal but opposite direction during the subsequent beam recombination thus canceling out any temperature shift in the recombined multispectral wavelength beam 57.

Although a light transmitting and refracting prism has been shown and depicted as the light refracting optical element, it would also be possible to utilize light defraction gratings in place of the prisms. In addition, whereas the sources of radiant energy were described as providing laser beams preferably in the red, green and blue spectral regions, the invention is not so limited and the wavelengths of the radiant source could be selected to be anywhere between or within the far infrared and the ultraviolet portion of the spectrum where laser energy can be generated. The present embodiments are, therefore, to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. In a multispectral laser printing apparatus of the type in which at least two laser beams of different spectral characteristics are provided from a single laser beam and comprising means for photomodulating each laser beam in response to an electrical signal representative of that spectral characteristic of an image to be printed, and exposure means for line scanning a photosensitive material with the modulated laser beams in order to print the image onto the photosensitive material, the improvement comprising:

a single light refracting optical element; and
means for redirecting each of the laser beams wherein said single light refracting optical element receives the single laser beam and disperses the received laser beam to provide at least the two laser beams therefrom; and said single light refracting optical element is structured and situated to thereafter combine the two laser beams redirected thereto into a single multispectral beam which is thereafter directed to the exposure means.

2. The improvement of claim 1 wherein said single light refracting optical element is a prism.

3. In a multispectral laser printing apparatus of the type in which at least two laser beams of different spectral characteristics are provided from a single laser beam having an argon laser source, and comprising means for photomodulating each laser beam in response to an electrical signal representative of that spectral characteristic of an image to be printed, and exposure means for line scanning a photosensitive material with the modulated laser beams in order to print the image onto the photosensitive material, the improvement comprising:

a single prism; and
means for redirecting each of the laser beams wherein said prism operates to disperse the single laser beam from said argon laser source into a first laser beam having a blue spectral characteristic and a second laser beam having a green spectral characteristic; and said prism thereafter operates to combine the blue and green modulated laser beams redirected thereto into a single beam which is thereafter directed to the exposure means.

4. In a multispectral laser printing apparatus of the type in which at least three laser beams of different spectral characteristics are provided from one laser beam having an argon laser source and another laser beam having a red spectral characteristic from a helium neon laser source, and comprising means for photomodulating each laser beam in response to an electrical signal representative of that spectral characteristic of an image to be printed, and exposure means for line scanning a photosensitive material with the modulated laser beams in order to print the image onto the photosensitive material the improvement comprising:

a single prism; and
means for redirecting each of the laser beams wherein said one prism operates to disperse said one laser beam from said argon laser source into a first laser beam having a blue spectral characteristic and a second laser beam having a green spectral characteristic to refract said red laser beam from said helium neon laser, and to thereafter combine the red, green and blue modulated laser beams redirected thereto into a single beam which is the thereafter directed to the exposure means.

5. A multispectral printing apparatus comprising:
means for providing at least two laser beams of different spectral characteristics from a first single laser beam and for subsequently combining said two laser beams into a second single laser beam including a single light refracting element structured and situated to provide said two laser beams from said first single laser beam while also combining said two laser beams into said second single laser beam;
means for redirecting at least said two laser beams back to said single light refracting element for combination thereby;
means for photomodulating at least each of said two laser beams in response to an electrical signal representative of that spectral characteristic of an image to be printed; and
exposure means for line scanning a photosensitive material with said second single laser beam in order to print the image onto the photosensitive material.

6. The laser printing apparatus of claim 5 wherein said single light refracting optical element is a prism.

7. The laser printing apparatus of claim 6 wherein said means for providing at least two laser beams includes an argon laser which provides said first single laser beam, said prism operates to disperse the first single laser beam from said argon laser into a first laser beam having a blue spectral characteristic and a second laser beam having a green spectral characteristic, and said prism operates to thereafter combine said blue and green modulated laser beams into said second single laser beam which is thereafter directed to the exposure means.

8. The laser printing apparatus of claim 7 wherein said means for providing at least two laser beams includes a helium neon laser which provides a third laser beam having a red spectral characteristic; wherein said prism further operates to refract said red laser beam from said helium neon laser; and said prism thereafter operates to combine the red, green and blue modulated laser beams into said second single laser beam which is thereafter directed to the exposure means.

* * * * *